United States Patent
Lei et al.

(10) Patent No.: US 11,301,773 B2
(45) Date of Patent: Apr. 12, 2022

(54) METHOD AND SYSTEM FOR TIME SERIES REPRESENTATION LEARNING VIA DYNAMIC TIME WARPING

(71) Applicant: International Business Machines Corporation, Armonk, NY (US)

(72) Inventors: Qi Lei, Austin, TX (US); Wei Sun, Tarrytown, NY (US); Roman Vaculin, Bronxville, NY (US); Jinfeng Yi, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 675 days.

(21) Appl. No.: 15/415,202

(22) Filed: Jan. 25, 2017

(65) Prior Publication Data

US 2018/0211181 A1     Jul. 26, 2018

(51) Int. Cl.
  *G06N 20/00*     (2019.01)
  *G06F 17/16*     (2006.01)
  *G06K 9/62*     (2022.01)

(52) U.S. Cl.
  CPC .............. *G06N 20/00* (2019.01); *G06F 17/16* (2013.01); *G06K 9/6232* (2013.01)

(58) Field of Classification Search
  CPC ............... G06F 17/30; G06F 2212/251; G06F 16/685; G10L 15/04
  See application file for complete search history.

(56) References Cited

U.S. PATENT DOCUMENTS

| 7,310,590 | B1 | 12/2007 | Bansal |
| 7,734,652 | B2 * | 6/2010 | Tamayo ............... G06F 16/283 707/792 |
| 9,292,576 | B2 | 3/2016 | Biem et al. |
| 2004/0153307 | A1 | 8/2004 | Tishby et al. |

(Continued)

OTHER PUBLICATIONS

'Motor Imagery EEG Signal Classification Scheme Based on Autoregressive Reflection Coefficients': Talukdar, 2014, IEEE 978-1-4799-5180.*

(Continued)

*Primary Examiner* — Li B. Zhen
*Assistant Examiner* — Peter D Coughlan
(74) *Attorney, Agent, or Firm* — Amin, Turocy & Watson, LLP

(57) ABSTRACT

Techniques that facilitate time series analysis using machine learning are provided. In one example, a system includes a matrix generation component, a matrix factorization component and a machine learning component. The matrix generation component converts at least a first stream of time series data and a second stream of time series data (e.g., raw time series data) into a data matrix (e.g., a partially-observed similarity matrix) that comprises void data and numerical data associated with the first stream of time series data and the second stream of time series data. The matrix factorization component factorizes the data matrix into a first factorization data matrix and a second factorization data matrix. The machine learning component processes a machine learning model based on first matrix data associated with the first factorization data matrix and second matrix data associated with the second factorization data matrix.

15 Claims, 10 Drawing Sheets

(56) References Cited

U.S. PATENT DOCUMENTS

| | | | |
|---|---|---|---|
| 2005/0123053 A1 | 6/2005 | Cooper et al. | |
| 2005/0256759 A1* | 11/2005 | Acharya | G06Q 30/02 705/7.31 |
| 2009/0132252 A1* | 5/2009 | Malioutov | G10L 15/04 704/258 |
| 2012/0041575 A1 | 2/2012 | Maeda et al. | |
| 2012/0221485 A1 | 8/2012 | Leidner et al. | |
| 2012/0259792 A1 | 10/2012 | Duan et al. | |
| 2013/0031019 A1 | 1/2013 | Herzog | |
| 2013/0080641 A1* | 3/2013 | Lui | H04L 43/045 709/226 |
| 2015/0113031 A1* | 4/2015 | Reinwald | G06F 12/0223 708/520 |
| 2016/0012088 A1* | 1/2016 | Rossi | G06Q 30/02 707/736 |
| 2016/0173690 A1* | 6/2016 | Perez | G06F 17/16 379/265.03 |
| 2016/0241346 A1* | 8/2016 | Hoffman | G10L 21/0224 |
| 2016/0371563 A1* | 12/2016 | Vidal | G06K 9/6247 |

OTHER PUBLICATIONS

'Temporal Regularized Matrix Factorization forHigh-dimensional Time Series Prediction': Yu, 2016, NIPS 30th conference on Neural Information Processing System.*
'Face Recognition using region-based nonnegative matrix factorization': Byeon, 2015.*
'Distributed Stochastic ADMM for Matrix Factorization': Yu, 2014.*
"A time series forest for classification and feature extraction" Deng, 2013, arxiv:1302.2272v2.*
'Landmarks: A New Model for Similarity-Based Pattern Querying in Time Series Databases': Perng. IEEE Aug. 6, 2002.*
'Similarity Match in Time Series Streams under Dynamic Time Warping Distance': Li 2008, IEEE, 978-0-7695.*
Analysis of Numeric Data Streams at Different Granularities: Sayal, 2005, IEEE, 0-7803-9017-2.*
'Dynamic Matrix Factorization With Social Influence': Aravkin, 2016, 2016 IEEE International Workshop On Machine Learning for Signal Processing, Sep. 13-16, 2016.*
'Missing Value Imputation With Unsupervised Backpropagation': Gashler, 2013, arXiv:1312.5394v1.*
Saravanan, et al., "Ensemble-Based Time Series Data Clustering for High Dimensional Data," ICIC International, 2014, ISSN 1349-4198, pp. 1457-1470.
Wang, et al., "Encoding Time Series as Images for Visual Inspection and Classification Using Tiled Convolutional Neural Networks," Trajectory-Based Behavior Analytics: Papers from the 2015 AAAI Workshop, 7 pages.
Keogh, et al., "Scaling Up Dynamic Time Warping for Data Mining Applications," Last Accessed: Oct. 19, 2016, 5 pages.
Murphy, "Dynamic Bayesian Networks: Representation, Inference and Learning," Fall 2002, 225 pages.
Adams. "The Knot Book—An Elementary Introduction to the Mathematical Theory of Knots." American Mathematical Society, 2004. 323 pages.
Berndt, et al. "Using Dynamic Time Warping to Find Patterns in Time Series." AAAI-94 Workshop on Knowledge Discovery in Databases, 1994. 12 pages.
Cardano, et al. "Ars magna, or, The rules of algebra Artis magnae, sive de regulis algebraicis. Lib. unus. Qui & totius operis de arithmetica, quod Opus Perfectum inscripsit, est in ordine decimus." Dover Publications, Inc. 1993. 291 pages.
Celebi, et al. "Gesture Recognition Using Skeleton Data withWeighted Dynamic Time Warping." VISAPP (1), 620-625, 2013. 6 pages.
Chan,et al. "Efficient Time Series Matching by Wavelets." Data Engineering, 1999. Proceed-ings., 15th International Conference on, 126-133. IEEE. 8 pages.

Chen, et al. "XGBoost: A Scalable Tree Boosting System." KDD '16 Proceedings of the 22nd ACM SIGKDD International Conference on Knowledge Discovery and Data Mining pp. 785-794. 10 pages.
Chen, et al. "UCR Time Series Classification Archive." www.cs.ucr.edu/~eamonn/time_series_data/, 2015. 14 pages.
Deng, et al. "A Time Series Forest for Classification and Feature Extraction." Information Sciences 239: 142-153 (2013), https://arxiv.org/abs/1302.2277. 22 pages.
Efrat, et al. "Curve Matching, Time Warping, and Light Fields: New Algorithms for Computing Similarity between Curves." Journal of Mathemat-ical Imaging and Vision 27(3):203-216. 19 pages.
Elman. "Finding Structure in Time." Cognitive Science 14, 179-211 (1990). 33 pages.
Faloutsos, et al. "Fast subsequence matching in time-series databases." SIGMOD '94 Proceedings of the 1994 ACM SIGMOD international conference on Management of data pp. 419-429 . 11 pages.
Fan, et al. "Liblinear: A Library for Large Linear Classication." Journal of Machine Learning Research 9 (2008) 1871-1874. 31 pages.
Fulcher, et al. "Highly comparative feature-based time-series classification." IEEE Trans. Knowl. Data Eng. 26, 3026 (2014). arXiv: 1401.3531 v2 [cs.LG] May 9, 2014. 20 pages.
Hochreiter, et al. "Long Short-term Memory." Neural Computation 9(8): 1735-1780, 1997. 32 pages.
Hsieh, et al. "Fast Coordinate Descent Methods with Variable Selection for Non-negative Matrix Factorization." KDD 11 Proceedings of the 17th ACM SIGKDD international conference on Knowledge discovery and data mining, pp. 1064-1072. 11 pages.
Keogh, et al. "Dimensionality Reduction for Fast Similarity Search in Large Time Series Databases." Knowledge and Information Systems 3(3):263-286.19 pages.
Korn, et al. "Efficiently Supporting Ad Hoc Queries in Large Datasets of Time Sequences." SIGMOD '97 Proceedings of the 1997 ACM SIGMOD international conference on Management of data pp. 289-300. 25 pages.
Langkvist, et al. "A review of unsupervised feature learning and deep learning for time-series modeling." ScienceDirect vol. 42, Jun. 1, 2014; 62 pages.
Li, et al. "Time Series Clustering: Complex is Simpler!" ICML, 185-192, 2011; 8 pages.
Lin, et al. "Experiencing SAX: a Novel Symbolic Representation of Time Series." Data Mining and Knowledge Discovery, Oct. 2007, vol. 15, Issue 2, pp. 107-144. 31 pages.
Muda, et al. "Voice Recognition Algorithms using Mel Frequency Cepstral Coefficient (MFCC) and Dynamic Time Narping (DTW) Techniques." Journal of Computing, vol. 2, Issue 3, Mar. 2010, https://sites.google.com/site/journalofcomputing/. 6 pages.
Muller, "Dtw-based motion comparison and retrieval." Information Retrieval for Music and Motion 211-226. 15 pages.
Nanopoulos, et al. Feature-based classification of time-series data. Information processing and technology, 2001. 10 pages.
Niennattrakul, et al. "Inaccuracies of Shape Averaging Method Using Dynamic Time Warping for Time Series Data." Computational Science—ICCS 2007: 7th International Conference, Beijing, China, May 27-30, 2007, Proceedings, Part I (pp. 513-520). 9 pages.
Paparrizos, et al. "k-Shape: Efficient and Accurate Clustering of Time Series." SIGMOD '15, May 31-Jun. 4, 2015. 16 pages.
Rakthanmanon, et al. "Addressing Big Data Time Series: Mining Trillions of Time Series Subsequences Under Dynamic Time Warping." ACM Transactions on Knowledge Discovery from Data 7(3) • Sep. 2013. 10 pages.
"Sempena, et al. ""Human action recognition using Dynamic Time Warping."" 2011 International Conference on Electrical Engineering and InformaticsJul. 17-19, 2011. 6 pages."
Stock, et al. "Implications of dy-namic factor models for var analysis." Technical report, Na-tional Bureau of Economic Research. 2005. 68 pages.
Sun, et al. "Guaranteed Matrix Completion via Non-convex Factorization." arXiv: 1411.8003v3 [cs.LG] Oct. 11, 2016. 11 pages.

(56) References Cited

OTHER PUBLICATIONS

Vandaele, et al. Coordinate Descent Methods for Symmetric Nonnegative Matrix Factorization. IEEE Transactions on Signal Processing 64 (21), pp. 5571-5584, 2016; arXiv: 1509.01404v2 [cs.NA] May 31, 2016. 25 pages.

Vial, et al. "Combination of dynamic time warping and multivariate analysis for the comparison of comprehensive two-dimensional gas chromatograms: Application to plant extracts." Journal of Chromatography A, vol. 1216, Issue 14, Apr. 3, 2009, pp. 2866-2872. 7 pages.

Wang, et al. "Experimental comparison of representation methods and distance measures for time series data." Data Mining and Knowledge Discovery, Mar. 2013, vol. 26, Issue 2, pp. 275-309; 35 pages.

Wang, et al. "Characteristic-based clustering for time series data." Data Mining and Knowledge Discovery 13(3):335-364, 2006. 31 pages.

Yang, et al. "10 challenging problems in data mining research." International Journal of Information Technology & Decision Making, vol. 5, No. 4 (2006) 597-604. 8 pages.

Yu, et al. "Scalable coordinate descent approaches to parallel matrix factoriza-tion for recommender systems." 2012 IEEE 12th International Conference on Data Mining. 10 pages.

List of IBM Patents Treated as Related.

Office Action for U.S. Appl. No. 15/840,599 dated Mar. 10, 2020, 46 pages.

"Voice Recognition Algorithms using Mel Frequency Cepstral Coefficient (MFCC) and Dynamic Time Warping (DTW) Techniques':u Muda, 2010, Journal of Computing vol. 2, issue 3".

Highly comparative feature based time series classification: Fulcher, 2014, IEEE.

'Temporal Regularized Matrix Factorization for High-dimensional Time Series Prediction': Yu, 2016, 30th Conference an Neuralw Information Processing Systems.

Final Office Action received for U.S. Appl. No. 15/840,599 dated Jul. 30, 2020, 81 pages.

Deng et al., "A Time Series Forest for Classification and Feature Extraction", Feb. 18, 2013, 22 pages.

Non Final Office Action received for U.S. Appl. No. 15/840,599 dated Mar. 11, 2021, 45 pages.

Final Office Action received for U.S. Appl. No. 15/840,599 dated Aug. 18, 2021, 46 pages.

\* cited by examiner

METHOD AND SYSTEM FOR TIME SERIES REPRESENTATION LEARNING VIA DYNAMIC TIME WARPING

BACKGROUND

The subject disclosure relates to machine learning systems, and more specifically, to performing a machine learning process using time series data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate machine learning using time series data are described.

According to an embodiment, a system can comprise a matrix generation component, a matrix factorization component, and a machine learning component. The matrix generation component can convert at least a first stream of time series data and a second stream of time series data into a data matrix that comprises void data and numerical data associated with the first stream of time series data and the second stream of time series data. The matrix factorization component can factorize the data matrix associated with the void data and the numerical data into a first factorization data matrix and a second factorization data matrix. The machine learning component can process a machine learning model based on first matrix data associated with the first factorization data matrix and second matrix data associated with the second factorization data matrix.

According to another embodiment, a computer-implemented method is provided. The computer-implemented method can comprise generating, by a system operatively coupled to a processor, a partially-observed similarity matrix based on time series data, wherein the partially-observed similarity matrix comprises void data and the time series data. Furthermore, the computer-implemented method can comprise factorizing, by the system, the partially-observed similarity matrix to generate a factorized similarity matrix. The computer-implemented method can also comprise providing, by the system, the factorized similarity matrix as input to one or more machine learning models.

According to yet another embodiment, a computer program product for machine learning can comprise a computer readable storage medium having program instructions embodied therewith. The program instructions can be executable by a processor and cause the processor to convert, by the processor, time series data into a similarity data matrix that comprises void data and similarity data values associated with the time series data. The program instructions can also cause the processor to factorize, by the processor, the similarity data matrix into a first factorization data matrix and a second factorization data matrix that comprise a lower dimensionality than the similarity data matrix. Furthermore, the program instructions can also cause the processor to provide, by the processor, the first factor- ization data matrix and the second factorization data matrix as input for a machine learning model.

DETAILED DESCRIPTION

Figure 1:
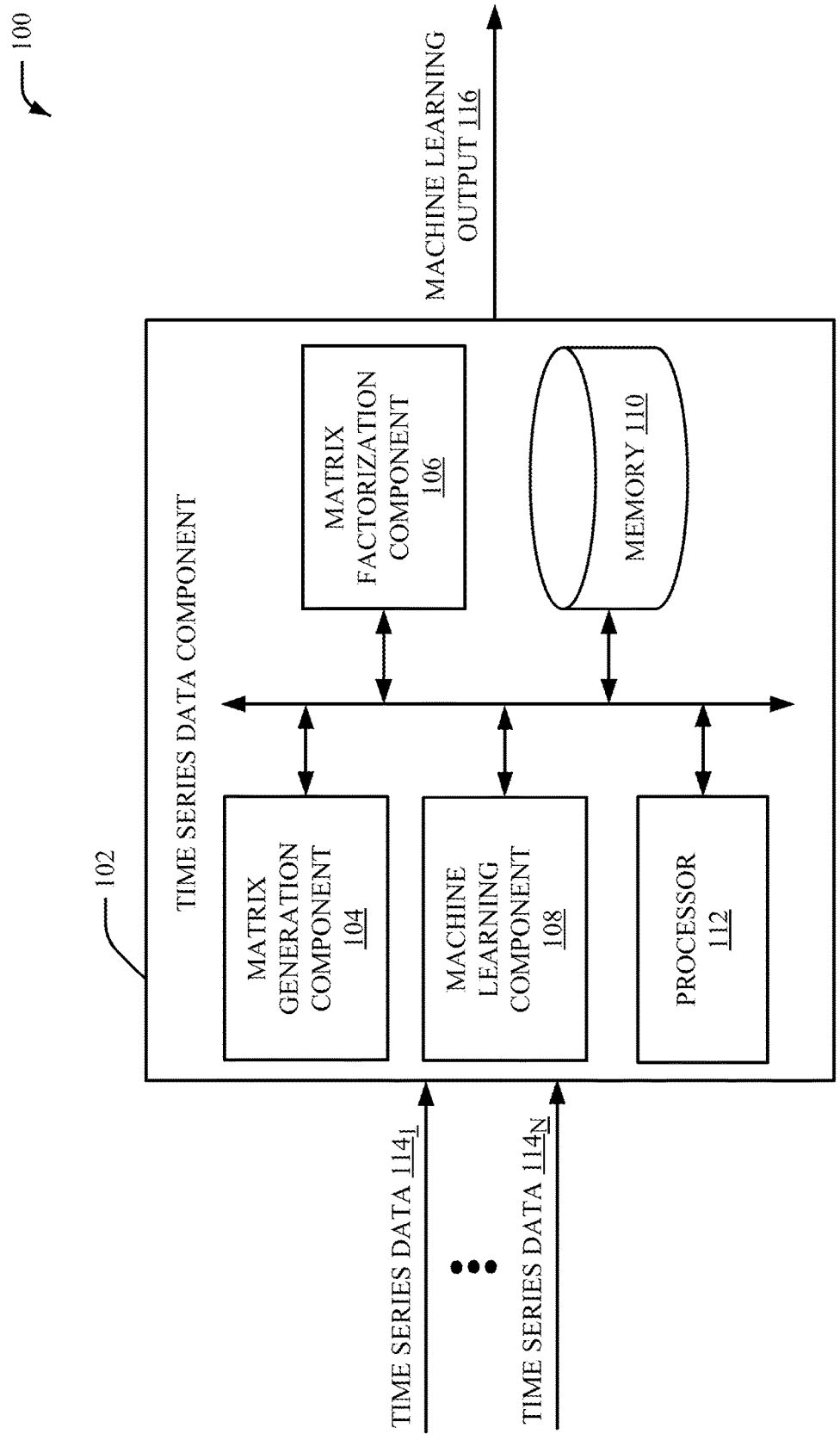
FIG. 1 illustrates a block diagram of an example, non-limiting system to facilitate machine learning using time series data in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning can be employed by numerous technologies to determine inferences and/or relationships among digital data. For example, machine learning technologies, signal processing technologies, image processing technologies, data analysis technologies and/or other technologies can employ machine learning models to analyze digital data, process digital data, determine inferences from digital data and/or determine relationships among digital data. Often times digital data is formatted as time series data. Time series data can be a sequence of data that is repeatedly generated and/or captured by a device (e.g., a computing device) at a plurality of time values during a certain time interval. However, time series data generally cannot be directly processed and/or directly analyzed by machine learning models. Therefore, machine learning models are currently generally unable to process and/or analyze a large amount of digital data.

Embodiments described herein include systems, computer-implemented methods, and computer program products that facilitate machine learning process using time series data. For example, feature representation of time series data can be learned to facilitate employment of the time series data by a machine learning model. Time series representation learning for machine learning can be accomplished via dynamic time warping where time data for different streams of time series data is modified and/or correlated while preserving temporal information of the different streams of time series data. In an embodiment, raw time series data with unequal time spans between different streams of the raw time series data can be converted into a matrix format that preserves the temporal information of the raw time series data. In one example, the raw time series data can be converted into a partially-observed data matrix that includes a set of data elements associated with the raw time series data and another set of data elements associated with void data. In another example, given a total of n time series values associated with raw time series data where n is an integer, an n×n partially-observed data matrix can be generated. The partially-observed data matrix can be, for example, a partially-observed data matrix that provides similarity measures (e.g., dynamic time warping similarity) between different time series values associated with raw time series data.

In another embodiment, symmetric matrix factorization can be performed on the partially-observed data matrix. For example, the partially-observed data matrix can be factorized into a first factorization matrix and a second factorization matrix that include a lower degree of dimensionality than the partially-observed data matrix. Multiplication of the first factorization matrix and the second factorization matrix can approximate the partially-observed data matrix. In an aspect, the partially-observed data matrix can be factorized to facilitate learning of new features associated with the time series data. In yet another embodiment, the first factorization matrix and the second factorization matrix can be provided as input to one or more machine learning models. As such, by providing the time series data as the first factorization matrix and the second factorization matrix, the time series data can be processed and/or analyzed by the one or more machine learning models. In yet another embodiment, a system that facilitates time series analysis using a machine learning technique can be provided. The system can include, for example, a matrix generation feature (e.g., a matrix generation component), a matrix factorization feature (e.g., a matrix factorization component), and a machine learning feature (e.g., a machine learning component). The matrix generation feature can employ raw time series data as input. The matrix generation feature can also generates a partially-observed similarity matrix with observed entries corresponding to dynamic time warping similarities between one or more time series pairs. The matrix factorization feature can symmetrically factorize the partially-observed similarity matrix to generate new time series feature data. In one example, the new time series feature data can be formatted as a matrix. The new time series feature data can be employed as input for one or more machine learning models (e.g., one or more machine learning models that cannot analyze raw time series data). The machine learning feature can processes a machine learning model based on the new time series feature data (e.g., a time series feature matrix) generated by the matrix factorization feature. Accordingly, flexibility for processing and/or analyzing time series data can be provided, effectiveness of a machine learning model can be improved, efficiency of one or more processors that execute a machine learning model can be improved, and/or a greater number of machine learning models can be employed for time series data. Moreover, an amount of time to perform a machine learning process can be reduced and/or amount of processing required for a machine learning process can be reduced.

FIG. 1 illustrates a block diagram of an example, non-limiting system 100 that facilitates machine learning using time series data in accordance with one or more embodiments described herein. In various embodiments, the system 100 can be a machine learning system associated with technologies such as, but not limited to, machine learning technologies, time series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, digital financial technologies, digital option trading technologies, and/or other digital technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a time series data component, etc.) for carrying out defined tasks related to machine learning. The system 100 and/or components of the system can be employed to solve new problems that arise through advancements in technologies mentioned above, employment of time series data, machine learning process and/or computer architecture, and the like. One or more embodiments of the system 100 can provide technical improvements to time series data systems, machine learning systems, artificial intelligence systems, data analysis systems, data analytics systems, data classification systems, data clustering systems, trajectory/journey analysis systems, medical device systems, collaborative filtering systems, recommendation systems, signal processing systems, word embedding systems, topic model systems, image processing systems, video processing systems, financial systems, option trading systems, and/or other digital systems. One or more embodiments of the system 100 can also provide technical improvements to a central processing unit associated with a machine learning process by improving processing performance of the central processing unit, reducing computing bottlenecks of the central processing unit, improving processing efficiency of the central processing unit, and/or reducing an amount of time for the central processing unit to perform the machine learning process.

In the embodiment shown in FIG. 1, the system 100 can include a time series data component 102. As shown in FIG. 1, the time series data component 102 can include a matrix generation component 104, a matrix factorization component 106, and a machine learning component 108. Aspects of the time series data component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the time series data component 102 can also include memory 110 that stores computer executable components and instructions. Furthermore, the time series data component 102 can include a processor 112 to facilitate execution of the instructions (e.g., computer executable components and corresponding instructions) by the time series data component 102. As shown, the matrix generation component 104, the matrix factorization component 106, the machine learning component 108, the memory 110 and/or the processor 112 can be electrically and/or communicatively coupled to one another in one or more embodiments.

The time series data component 102 (e.g., the matrix generation component 104 of the time series data component 102) can receive time series data $114_{1-N}$. The time series data $114_{1-N}$ can include two or more streams of time series data. In one example, the time series data $114_{1-N}$ can include two or more streams of time series data with unequal time spans. For instance, a first stream of time series data $114_1$ can include a first time span and a second stream of time series data $114_2$ can include a second time span that is different than the first time span. In another example, the time series data $114_{1-N}$ can include two or more streams of time series data with equal time spans. For instance, a first stream of time series data $114_1$ and a second stream of time series data $114_2$ can include a corresponding time span. As used herein, "time series data" can be a sequence of data that is repeatedly generated and/or captured at a plurality of time values during a certain time interval. In an aspect, the time series data $114_{1-N}$ can be raw time series data (e.g., unprocessed time series data).

The matrix generation component 104 can convert the time series data $114_{1-N}$ into a data matrix. The data matrix generated by the matrix generation component 104 can be a similarity data matrix that configures the data matrix and/or groups the time series data $114_{1-N}$ within the data matrix based on one or more similarities between the time series data $114_{1-N}$. The data matrix generated by the matrix generation component 104 can also be a partially-observed data matrix that includes void data and time series data associated with the time series data $114_{1-N}$. For instance, the data matrix generated by the matrix generation component 104 can be a partially-observed data matrix that includes one or more data elements that include void data and one or more other data elements that include the time series data $114_{1-N}$. In one example, the data matrix generated by the matrix generation component 104 can be a partially-observed similarity data matrix that represents a pair of combinations associated with the time series data $114_{1-N}$. In an aspect, the matrix generation component 104 can compare data associated with a corresponding time value from a first stream of time series data and a second stream of time series data. For instance, the matrix generation component 104 can determine a difference between first data associated a first stream of time series data that corresponds to a particular time value and second data associated with a second stream of time series data that corresponds to the particular time value. Furthermore, a data element of the data matrix can correspond to the difference between the first data associated with the first stream of time series data and the second data associated with the second stream of time series data.

In an embodiment, the matrix generation component 104 can randomly sample the time series data $114_{1-N}$ to facilitate generation of the data matrix. For instance, rather than sampling and/or comparing every corresponding time series pair from a first stream of time series data $114_1$ and a second stream of time series data $114_2$, the matrix generation component 104 can randomly sample a subset of time series pairs from the first stream of time series data $114_1$ and the second stream of time series data $114_2$. In one example, the matrix generation component 104 can randomly sample a subset of time series pairs from the first stream of time series data $114_1$ and the second stream of time series data $114_2$ based on a linearithmic value such as, for example, $O(n \log(n))$ where n corresponds to a total number of time series pairs between the first stream of time series data $114_1$ and the second stream of time series data $114_2$. A such, the matrix generation component 104 can randomly sample the time series data $114_{1-N}$ to facilitate the conversion of the time series data $114_{1-N}$ into the data matrix.

In another embodiment, the matrix generation component 104 can convert the time series data $114_{1-N}$ into the data matrix based on a dynamic time warping technique that modifies and/or correlates time data associated with the time series data $114_{1-N}$. The dynamic warping technique employed by the matrix generation component 104 can include pattern recognition and/or dynamic processing of the time series data $114_{1-N}$ to align different streams of the time series data $114_{1-N}$ so that a particular distance measure between the different streams of the time series data $114_{1-N}$ is minimized. The particular distance measure can include, but is not limited to, an absolute value of a distance between the different streams of the time series data $114_{1-N}$, a square of a distance between the different streams of the time series data $114_{1-N}$, etc. In an embodiment, using a dynamic time warping technique, the matrix generation component 104 can align a first stream of time series data $114_1$ and a second stream of time series data $114_2$ by non-linearly warping the first stream of time series data $114_1$ and/or the second stream of time series data $114_2$. Non-linear warping of the first stream of time series data $114_1$ and/or the second stream of time series data $114_2$ can be performed using a cost matrix that aligns the first stream of time series data $114_1$ and the second stream of time series data $114_2$ while minimizing cost. The cost matrix can be, for example, a score indicative of a degree of difference between different streams of the time series data $114_{1-N}$. In an aspect, data elements of the data matrix generated by the matrix generation component 104 can correspond to scores indicative of a degree of difference between different streams of the time series data $114_{1-N}$. For instance, a first data element of the data matrix generated by the matrix generation component 104 can correspond to a first score indicative of a first degree of difference between portions of the first stream of time series data $114_1$ and the second stream of time series data $114_2$ with a first corresponding time value, a second data element of the data matrix generated by the matrix generation component 104 can correspond to a second score indicative of a second degree of difference between portions of the first stream of time series data $114_1$ and the second stream of time series data $114_2$ with a second corresponding time value, etc. Additionally or alternatively, a first data element of the data matrix generated by the matrix generation component 104 can correspond to a first score indicative of a first degree of difference between portions of the first stream of time series data $114_1$ and the second stream of time series data $114_2$ with a first corresponding time value, a second data element of the data matrix generated by the matrix generation component 104 can correspond to a second score indicative of a second degree of difference between portions of the first stream of time series data $114_1$ and the second stream of time series data $114_2$ with a second corresponding time value, etc.

The matrix factorization component 106 can factorize the data matrix generated by the matrix generation component 104 into a first factorization data matrix and a second factorization data matrix. The first factorization data matrix and the second factorization data matrix can be a product of matrices for the data matrix generated by the matrix generation component 104. For instance, multiplication of the first factorization data matrix and the second factorization data matrix can produce the data matrix generated by the matrix generation component 104. In an aspect, the matrix factorization component 106 can directly factorize the data matrix generated by the matrix generation component 104. For example, data elements of the data matrix generated by the matrix generation component 104 can be factorized without further processing of the data elements included in the data matrix. In another aspect, the matrix factorization component 106 can employ a cyclic coordinate descent technique to facilitate factorization of the data matrix into the first factorization data matrix and the second factorization data matrix. The cyclic coordinate descent technique employed by the matrix factorization component 106 can include learning and/or updating of individual data elements within the data matrix. The cyclic coordinate descent technique employed by the matrix factorization component 106 can additionally include cyclic iteration through data elements of the data matrix. For instance, the matrix factorization component 106 can update and/or learn a first individual data element within the data matrix with respect to other data elements within the data matrix, then the matrix factorization component 106 can update and/or learn a second individual data element within the data matrix with respect to other data elements within the data matrix, then the matrix factorization component 106 can update and/or learn a third individual data element within the data matrix with respect to other data elements within the data matrix, etc. In an embodiment, the matrix factorization component 106 can learn data for void data associated with the first factorization data matrix and the second factorization data matrix based on the cyclic coordinate descent technique that cyclically analyzes a set of void data elements associated with the void data. For instance, the matrix factorization component 106 can learn and/or determine a value for a first void data element within the data matrix based on other data elements within the data matrix, then the matrix factorization component 106 can learn and/or determine a value for a second void data element within the data matrix based on other data elements within the data matrix, then the matrix factorization component 106 can learn and/or determine a value for a third void data element within the data matrix based on other data elements within the data matrix, etc. In an aspect, the matrix factorization component 106 can preserve temporal data of the time series data $114_{1-N}$. For instance, the matrix factorization component 106 can maintain temporal information of raw time series data associated with time series data $114_{1-N}$ during generation of the first factorization data matrix and the second factorization data matrix.

The machine learning component 108 can processes a machine learning model based on first matrix data associated with the first factorization data matrix and second matrix data associated with the second factorization data matrix. For instance, the first factorization data matrix and the second factorization data matrix can be provided as input for a machine learning model executed by the machine learning component 108. In certain embodiments, the machine learning component 108 can employ parallel computing to process the first matrix data associated with the first factorization data matrix and the second matrix data associated with the second factorization data matrix. For instance, the machine learning component 108 can perform parallel computing associated with two or more processors that process one or more portions of the first matrix data and/or the second matrix data in parallel. In one example, the machine learning component 108 can execute a classification machine learning model using the first factorization data matrix and the second factorization data matrix. A classification machine learning model can be, for example, a machine learning model that maps the time series data $114_{1-N}$ to one or more categories. In another example, the machine learning component 108 can execute a regression machine learning model using the first factorization data matrix and the second factorization data matrix. A regression machine learning model can be, for example, a machine learning model that determines relationships among the time series data $114_{1-N}$. In yet another example, the machine learning component 108 can execute a clustering machine learning model using the first factorization data matrix and the second factorization data matrix. A clustering machine learning model can be, for example, a machine learning model that groups related data from the time series data $114_{1-N}$ into a corresponding group. In an aspect, the machine learning component 108 can generate machine learning output 116. The machine learning output 116 can be output generated by the machine learning model that is processed by the machine learning component 108 based on the first factorization data matrix and the second factorization data matrix. The machine learning output 116 can also provide one or more inferences, provide one or more predictions, and/or determine one or more relationships among the time series data $114_{1-N}$. As such, direct analysis and/or direct processing of the time series data $114_{1-N}$ by a machine learning model can be provided. Moreover, performance of a processor (e.g., the processor 112) with respect to a machine learning process (e.g., a speed for performing machine learning and/or an amount of memory employed for machine learning) can be improved by allowing a machine learning model to employ matrices as inputs and/or to directly analyze time series data. Furthermore, processing capability of a processor (e.g., the processor 112) associated with a machine learning process can be improved by allowing a machine learning model to employ matrices as inputs and/or to directly analyze time series data.

It is to be appreciated that the time series data component 102 (e.g., the matrix generation component 104, the matrix factorization component 106 and/or the machine learning component 108) performs a matrix generation process, a matrix factorization process and/or a machine learning process associated with time series data (e.g., time series data $114_{1-N}$) that cannot be performed by a human (e.g., is greater than the capability of a single human mind). For example, an amount of time series data processed, a speed of processing of times series data and/or data types of the time series data processed by the time series data component 102 (e.g., the matrix generation component 104, the matrix factorization component 106 and/or the machine learning component 108) over a certain period of time can be greater, faster and different than an amount, speed and data type that can be processed by a single human mind over the same period of time. The time series data component 102 (e.g., the matrix generation component 104, the matrix factorization component 106 and/or the machine learning component 108) can also be fully operational towards performing one or more other functions (e.g., fully powered on, fully executed, etc.)

while also performing the above-referenced matrix generation process, matrix factorization process and/or machine learning process. Moreover, machine learning output (e.g., machine learning output 116) generated by the time series data component 102 (e.g., the matrix generation component 104, the matrix factorization component 106 and/or the machine learning component 108) can include information that is impossible to obtain manually by a user. For example, an amount of information included in the machine learning output (e.g., machine learning output 116) and/or a variety of information included in the machine learning output (e.g., machine learning output 116) can be more complex than information obtained manually by a user.

Figure 2:
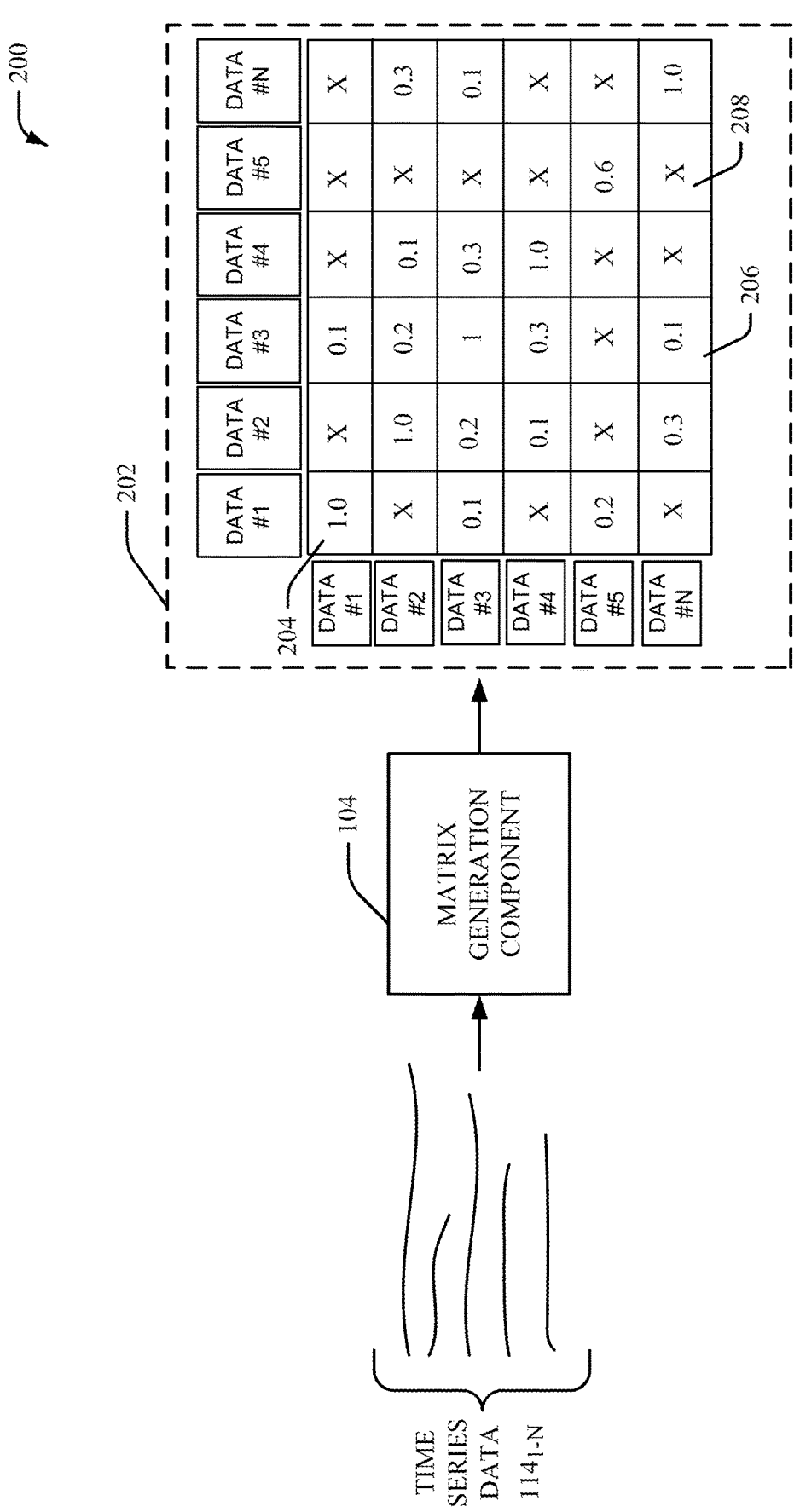
FIG. 2 illustrates a block diagram of an example, non-limiting system associated with matrix generation in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the matrix generation component 104 of the time series data component 102. The matrix generation component 104 can receive the time series data $114_{1-N}$. The time series data $114_{1-N}$ can include different streams of time series data with equal time spans and/or unequal time spans. Based on the time series data $114_{1-N}$, the matrix generation component 104 can generate a data matrix 202. The data matrix 202 can include digital data formatted as a matrix of digital data. The data matrix 202 can also include a set of data elements. For instance, the set of data elements of the first data block can include one or more data elements associated with numerical data (e.g., one or more data elements with a numerical value) and/or one or more data elements associated with void data (e.g., one or more data elements without a numerical value). In an aspect, data associated with the data matrix 202 can be related to a set of users (e.g., a set of user identities), a set of ratings, a set of items, a set of words, a set of topics, a set of documents, a set of parameterized functions, a set of movies, a set of songs, a set of books, a set of products, a set of restaurants, a set of internet search queries, a set of social tags, a set of items for purchase, a set of services, a set of other items, and/or a set of other data. In an embodiment, the data matrix 202 can be a similarity data matrix that compares similarities between data in the time series data $114_{1-N}$. For example, the data matrix 202 can compare similarities between corresponding data pairs from the time series data $114_{1-N}$. A corresponding data pair can be, for example, a first data value from a first stream of time series data and a second data value from a first stream of time series data with a corresponding time value. In another embodiment, the data matrix 202 can be a partially-observed data matrix in which at least a portion of information regarding one or more data elements is not included in the data matrix 202. For instance, the data matrix 202 can be a partially-observed data matrix that includes void data and similarity data values associated with the time series data $114_{1-N}$. In one example, the data matrix 202 can include a data element 204 that includes a data value indicative of similarity score (e.g., 1.0 corresponding to a high degree of similarity) between a time series pair from the time series data $114_{1-N}$. In another example, the data matrix 202 can include a data element 206 that includes a data value indicative of another similarity score (e.g., 0.1 corresponding to a low degree of similarity) between a time series pair from the time series data $114_{1-N}$. In yet another example, the data matrix 202 can include a data element 208 that includes void data indicative of an undetermined similarity between a time series pair from the time series data $114_{1-N}$. In an embodiment, numerical data of the data matrix 202 can correspond to dynamic time warping similarities between one or more time series pairs associated with the time series data $114_{1-N}$.

In an aspect, time series pairs associated with the data element 204 and the data element 206 from the data matrix 202 can be randomly sampled data from the time series data $114_{1-N}$. Furthermore, the matrix generation component 104 can employ a dynamic time warping technique to determine similarity scores for the data element 204 and the data element 206. In a non-limiting example, the time series data $114_{1-N}$ can include 10,000 time series and the matrix generation component 104 can generate the data matrix 202 with a size equal to 8 MB in 1 second. In another non-limiting example, the time series data $114_{1-N}$ can include 64,523 time series and the matrix generation component 104 can generate the data matrix 202 with a size equal to 13 MB in 5 seconds. In yet another non-limiting example, the time series data $114_{1-N}$ can include 51 million time series and the matrix generation component 104 can generate the data matrix 202 with a size equal to 16 MB in 2 hours.

Figure 3:
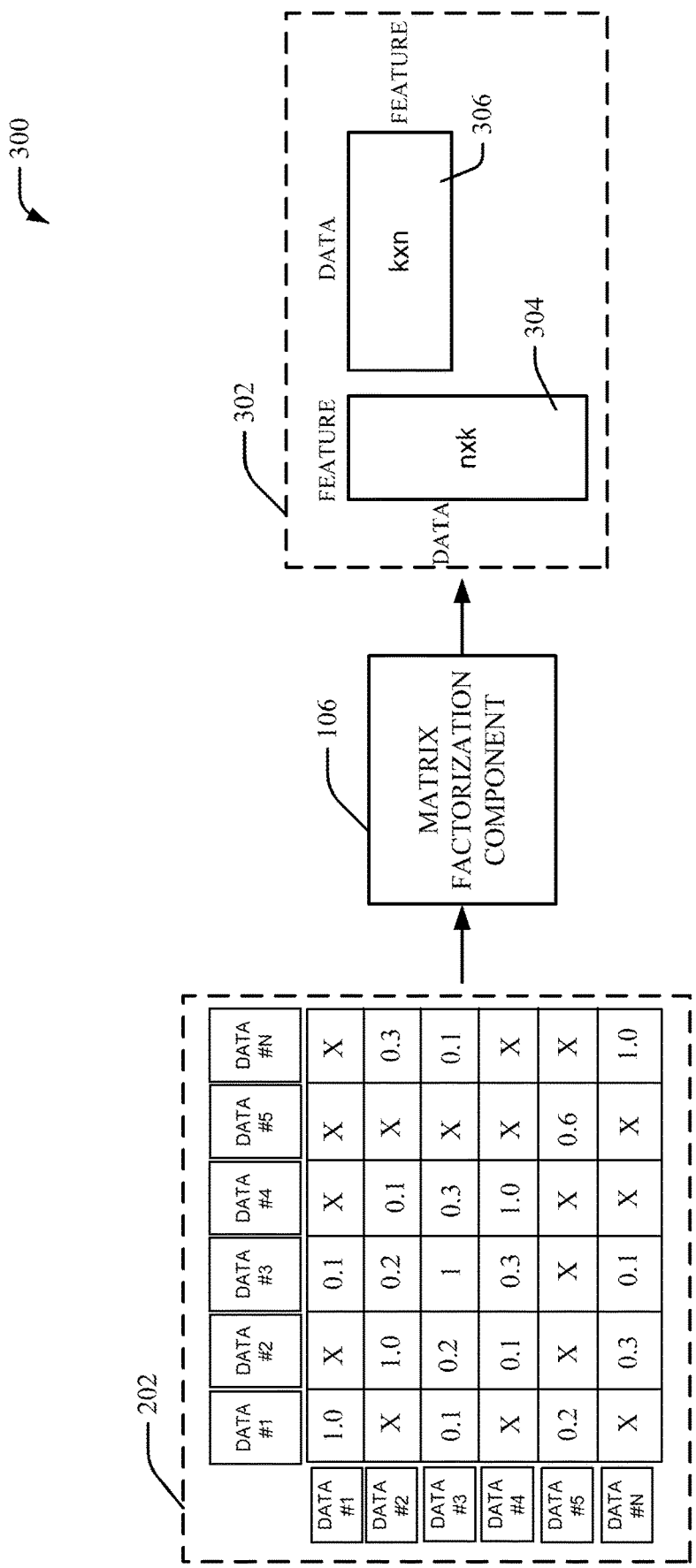
FIG. 3 illustrates a block diagram of an example, non-limiting system associated with matrix factorization in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the matrix factorization component 106 of the time series data component 102. The matrix factorization component 106 can receive the data matrix 202 generated by the matrix generation component 104. Based on the data matrix 202, the matrix factorization component 106 can generate matrix factorization data 302 associated with the time series data $114_{1-N}$. The matrix factorization data 302 can include a first factorization data matrix 304 and a second factorization data matrix 306. For instance, multiplication of the first factorization data matrix 304 and the second factorization data matrix 306 can approximate the data matrix 202. Dimensionality of the first factorization data matrix 304 and the second factorization data matrix 306 can be a smaller size than the data matrix 202. For example, when a size of the data matrix 202 is equal to n×n where n is a positive integer, the first factorization data matrix 304 can be a data matrix with a size equal to n×k and the second factorization data matrix 306 can be a data matrix with a size equal to k×n, where k is a positive integer less than n.

In an aspect, rather than performing matrix factorization after completing the data matrix 202, the matrix factorization component 106 can directly factorize the data matrix 202 using a symmetric matrix factorization solver associated with the matrix factorization component 106. For instance, the matrix factorization component 106 can directly factorize the data matrix 202 generated by the matrix generation component 104 into the first factorization data matrix 304 and the second factorization data matrix 306. In another aspect, the matrix factorization component 106 can factorize the data matrix 202 into the first factorization data matrix 304 and the second factorization data matrix 306 based on a cyclic coordinate descent technique. The cyclic coordinate descent technique employed by the matrix factorization component 106 can include learning and/or updating of individual data elements within the first factorization data matrix 304 and/or the second factorization data matrix 306. The cyclic coordinate descent technique employed by the matrix factorization component 106 can additionally include cyclic iteration through data elements of the first factorization data matrix 304 and/or the second factorization data matrix 306. For instance, the matrix factorization component 106 can update and/or learn a first individual data element within the first factorization data matrix 304 and/or the second factorization data matrix 306 with respect to other data elements within the first factorization data matrix 304 and/or the second factorization data matrix 306, then the matrix factorization component 106 can update and/or learn a second individual data element within the first factorization data matrix 304 and/or the second factorization data matrix 306 with respect to other data elements within the first factorization data matrix 304 and/or the second factorization data matrix 306, then the matrix factorization component 106 can update and/or learn a third individual data element within the first factorization data matrix 304 and/or the second factorization data matrix 306 with respect to other data elements within the first factorization data matrix 304 and/or the second factorization data matrix 306, etc. In an embodiment, the matrix factorization component 106 can learn data for void data associated with the first factorization data matrix 304 and/or the second factorization data matrix 306 based on the cyclic coordinate descent technique that cyclically analyzes a set of void data elements associated with the void data. For instance, the matrix factorization component 106 can learn and/or determine a value for a first void data element within the first factorization data matrix 304 and/or the second factorization data matrix 306 based on other data elements within the first factorization data matrix 304 and/or the second factorization data matrix 306, then the matrix factorization component 106 can learn and/or determine a value for a second void data element within the first factorization data matrix 304 and/or the second factorization data matrix 306 based on other data elements within the first factorization data matrix 304 and/or the second factorization data matrix 306, then the matrix factorization component 106 can learn and/or determine a value for a third void data element within the first factorization data matrix 304 and/or the second factorization data matrix 306 based on other data elements within the first factorization data matrix 304 and/or the second factorization data matrix 306, etc. In a non-limiting example where the data matrix 202 is a 10,000× 10,000 data matrix, the matrix factorization component 106 can factorize the data matrix 202 into the first factorization data matrix 304 and the second factorization data matrix 306 in 3 seconds. In another non-limiting example where the data matrix 202 is a 64,523×64,523 data matrix, the matrix factorization component 106 can factorize the data matrix 202 into the first factorization data matrix 304 and the second factorization data matrix 306 in 8 seconds. In yet another non-limiting example where the data matrix 202 is a 51 million×51 million data matrix, the matrix factorization component 106 can factorize the data matrix 202 into the first factorization data matrix 304 and the second factorization data matrix 306 in 8 seconds. As such, the matrix factorization component 106 can factorize the data matrix 202 into the first factorization data matrix 304 and the second factorization data matrix 306 using reduced per-iteration cost. Moreover, new feature representations associated with the first factorization data matrix 304 and/or the second factorization data matrix 306 can be learned in an efficient manner.

Figure 4:
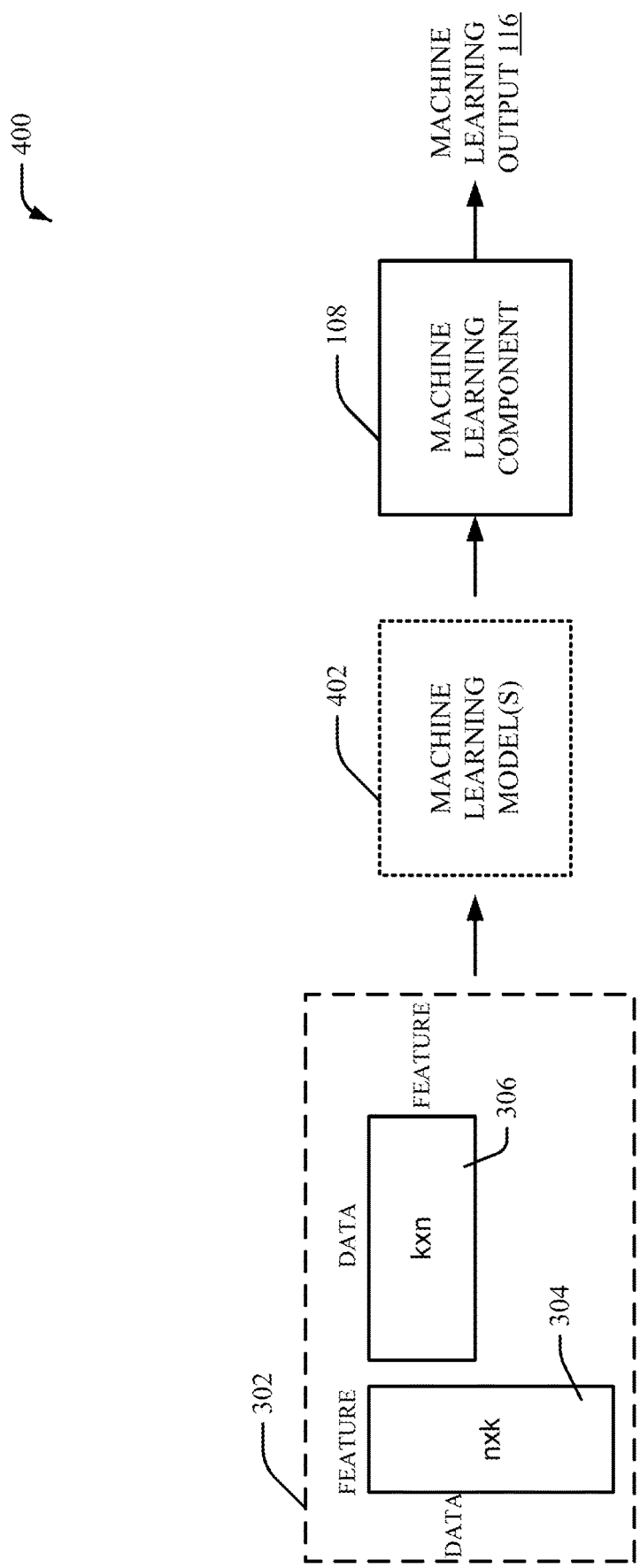
FIG. 4 illustrates a block diagram of an example, non-limiting system associated with machine learning in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the machine learning component 108 of the time series data component 102. At least one machine learning model 402 executed by the machine learning component 108 can receive the matrix factorization data 302 (e.g., the first factorization data matrix 304 and the second factorization data matrix 306) generated by the matrix factorization component 106. In one example, the at least one machine learning model 402 can be a classification machine learning model that maps the matrix factorization data 302 (e.g., data included in the first factorization data matrix 304 and the second factorization data matrix 306) to one or more categories. In another example, the at least one machine learning model 402 can be a regression machine learning model that determines relationships among the matrix factorization data 302 (e.g., data included in the first factorization data matrix 304 and the second factorization data matrix 306). In yet another example, the at least one machine learning model 402 can be a clustering machine learning model that groups related data from the matrix factorization data 302 (e.g., data included in the first factorization data matrix 304 and the second factorization data matrix 306) into a corresponding group.

In an embodiment, the machine learning component 108 can employ one or more artificial intelligence techniques to execute the at least one machine learning model 402 based on the matrix factorization data 302 (e.g., data included in the first factorization data matrix 304 and the second factorization data matrix 306). For example, the machine learning component 108 can extract information that is indicative of correlations, inferences and/or expressions from the matrix factorization data 302 (e.g., data included in the first factorization data matrix 304 and the second factorization data matrix 306) based on principles of artificial intelligence. The machine learning component 108 can generate the machine learning output 116 based on the execution of the at least one machine learning model 402 using the matrix factorization data 302 (e.g., data included in the first factorization data matrix 304 and the second factorization data matrix 306). The machine learning output 116 can include, for example, learning, correlations, inferences and/or expressions associated with the matrix factorization data 302 (e.g., data included in the first factorization data matrix 304 and the second factorization data matrix 306). In an aspect, the machine learning component 108 can perform learning with respect to the matrix factorization data 302 (e.g., data included in the first factorization data matrix 304 and the second factorization data matrix 306) explicitly or implicitly. The machine learning component 108 can also employ an automatic classification system and/or an automatic classification process to facilitate analysis of the matrix factorization data 302 (e.g., data included in the first factorization data matrix 304 and the second factorization data matrix 306). For example, the machine learning component 108 can employ a probabilistic and/or statistical-based analysis (e.g., factoring into the analysis utilities and costs) to learn and/or generate inferences with respect to the matrix factorization data 302 (e.g., data included in the first factorization data matrix 304 and the second factorization data matrix 306). The machine learning component 108 can employ, for example, a support vector machine (SVM) classifier to learn and/or generate inferences for the matrix factorization data 302 (e.g., data included in the first factorization data matrix 304 and the second factorization data matrix 306). Additionally or alternatively, the machine learning component 108 can employ other classification techniques associated with Bayesian networks, decision trees and/or probabilistic classification models. Classifiers employed by the machine learning component 108 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class— that is, f(x)=confidence(class).

In an aspect, the machine learning component 108 can include an inference component (not shown) that can further enhance automated aspects of the machine learning component 108 utilizing in part inference based schemes to facilitate learning and/or generating inferences for the matrix factorization data 302 (e.g., data included in the first factorization data matrix 304 and the second factorization data matrix 306). The machine learning component 108 can employ any suitable machine-learning based techniques, statistical-based techniques and/or probabilistic-based techniques. For example, the machine learning component 108 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 108 can perform a set of machine learning computations associated with analysis of the matrix factorization data 302 (e.g., data included in the first factorization data matrix 304 and the second factorization data matrix 306). For example, the machine learning component 108 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, Gaussian mixture model machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

Figure 5:
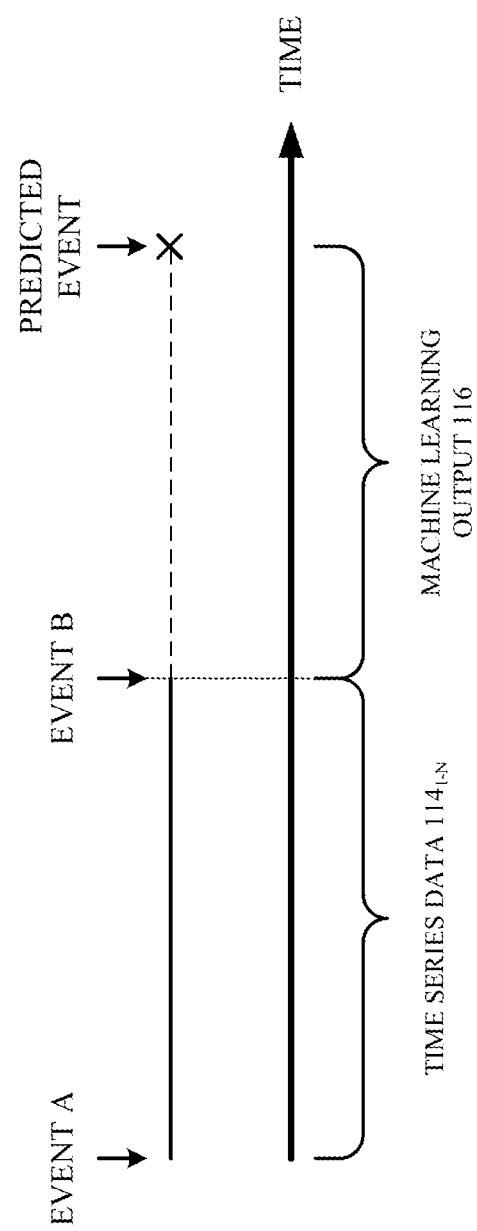
FIG. 5 illustrates an example, non-limiting system associated with a machine learning process in accordance with one or more embodiments described herein.

FIG. 5 illustrates an example, non-limiting system 500 in accordance with one or more embodiments described herein. Repetitive description of like elements employed in other embodiments described herein is omitted for sake of brevity.

The system 500 illustrates an example, machine learning process associated with the time series data component 102 (e.g., the matrix generation component 104, the matrix factorization component 106 and/or the machine learning component 108). In a non-limiting example shown in FIG. 5, the time series data $114_{1-N}$ received by the time series data component 102 (e.g., the matrix generation component 104, the matrix factorization component 106 and/or the machine learning component 108) can be associated with an event A and an event B that occur at different instances in time. For example, the event A can be associated with opening of an account for a user identity in a financial services system. Furthermore, the event B can be associated with approval of another account (e.g., an option account approval) for the user identify in the financial services system. In an aspect, the time series data $114_{1-N}$ received by the time series data component 102 (e.g., the matrix generation component 104, the matrix factorization component 106 and/or the machine learning component 108) can be training data for a machine learning process associated with the time series data component 102 (e.g., the matrix generation component 104, the matrix factorization component 106 and/or the machine learning component 108). The time series data component 102 (e.g., the matrix generation component 104, the matrix factorization component 106 and/or the machine learning component 108) can employ the time series data $114_{1-N}$, as more fully disclosed herein, to predict information related to the user identity and/or the financial services system. For instance, the machine learning output 116 generated by the time series data component 102 (e.g., the matrix generation component 104, the matrix factorization component 106 and/or the machine learning component 108) can include a predicted event related to the user identity and/or the financial services system. In one example, the predicted event included in the machine learning output 116 can be a prediction related to timing of a first option trade (e.g., a date for a first option trade) by the user identity. However, it is to be appreciated that the time series data component 102 (e.g., the matrix generation component 104, the matrix factorization component 106 and/or the machine learning component 108) can perform other types of learning with respect to the time series data $114_{1-N}$. For example, the time series data $114_{1-N}$ can be related to a machine learning system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system.

Figure 6:
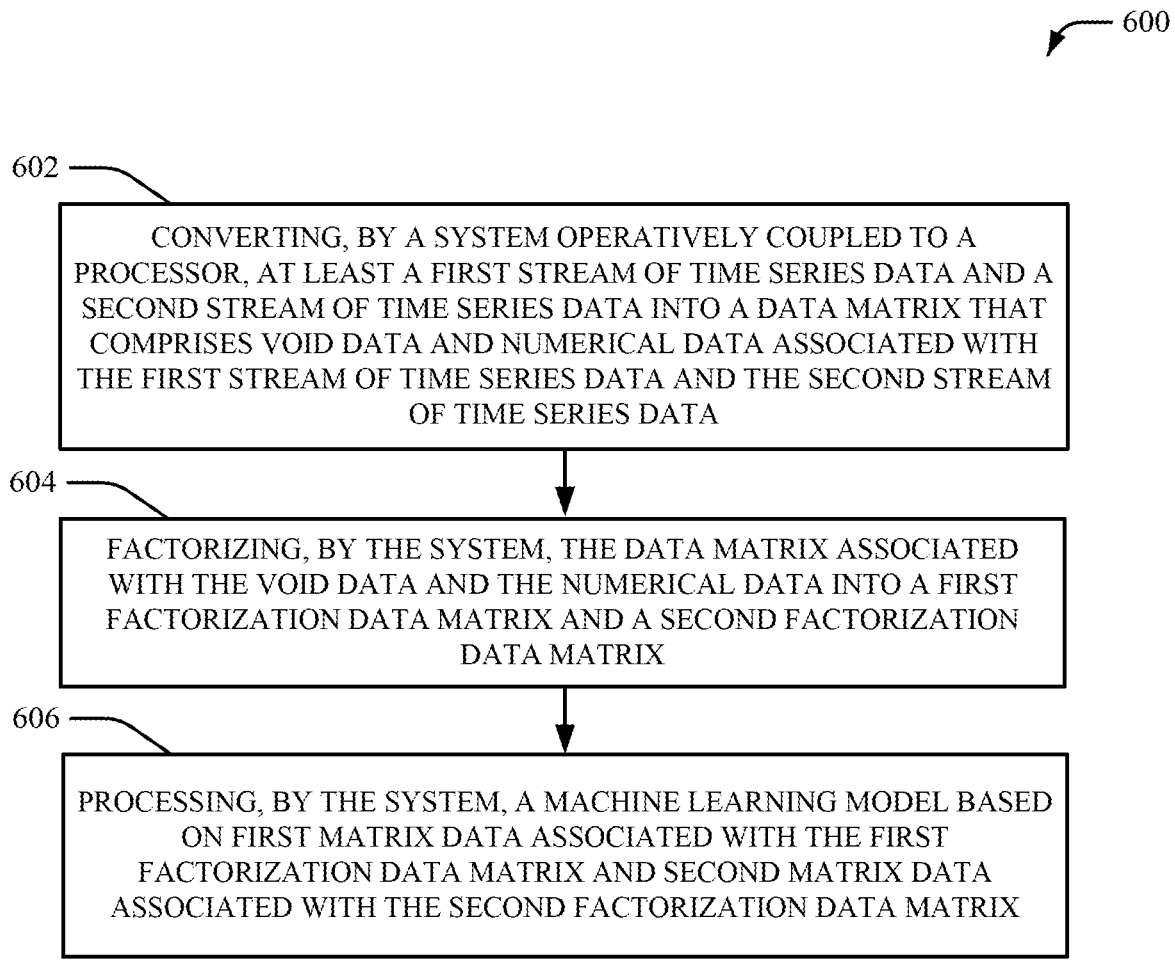
FIG. 6 illustrates a flow diagram of an example, non-limiting computer-implemented method for facilitating machine learning using time series data in accordance with one or more embodiments described herein.

FIG. 6 illustrates a flow diagram of an example, non-limiting computer-implemented method 600 for facilitating machine learning using time series data in accordance with one or more embodiments described herein. At 602, at least a first stream of time series data and a second stream of time series data are converted, by a system operatively coupled to a processor (e.g., by matrix generation component 104), into a data matrix that comprises void data and numerical data associated with the first stream of time series data and the second stream of time series data. The numerical data can, for example, represent a measured similarity between time series values of the first stream of time series data and the second stream of time series data. In one example, the data matrix can be a partially-observed similarity data matrix. At 604, the data matrix associated with the void data and the numerical data is factorized, by the system (e.g., by matrix factorization component 106), into a first factorization data matrix and a second factorization data matrix. For example, multiplication of the first factorization data matrix and the second factorization data matrix can approximate the data matrix. At 606, a machine learning model is processed, by the system (e.g., by machine learning component 108), based on first matrix data associated with the first factorization data matrix and second matrix data associated with the second factorization data matrix. For example, the time series data can be provided to the machine learning model as the first matrix data and the second matrix data.

Figure 7:
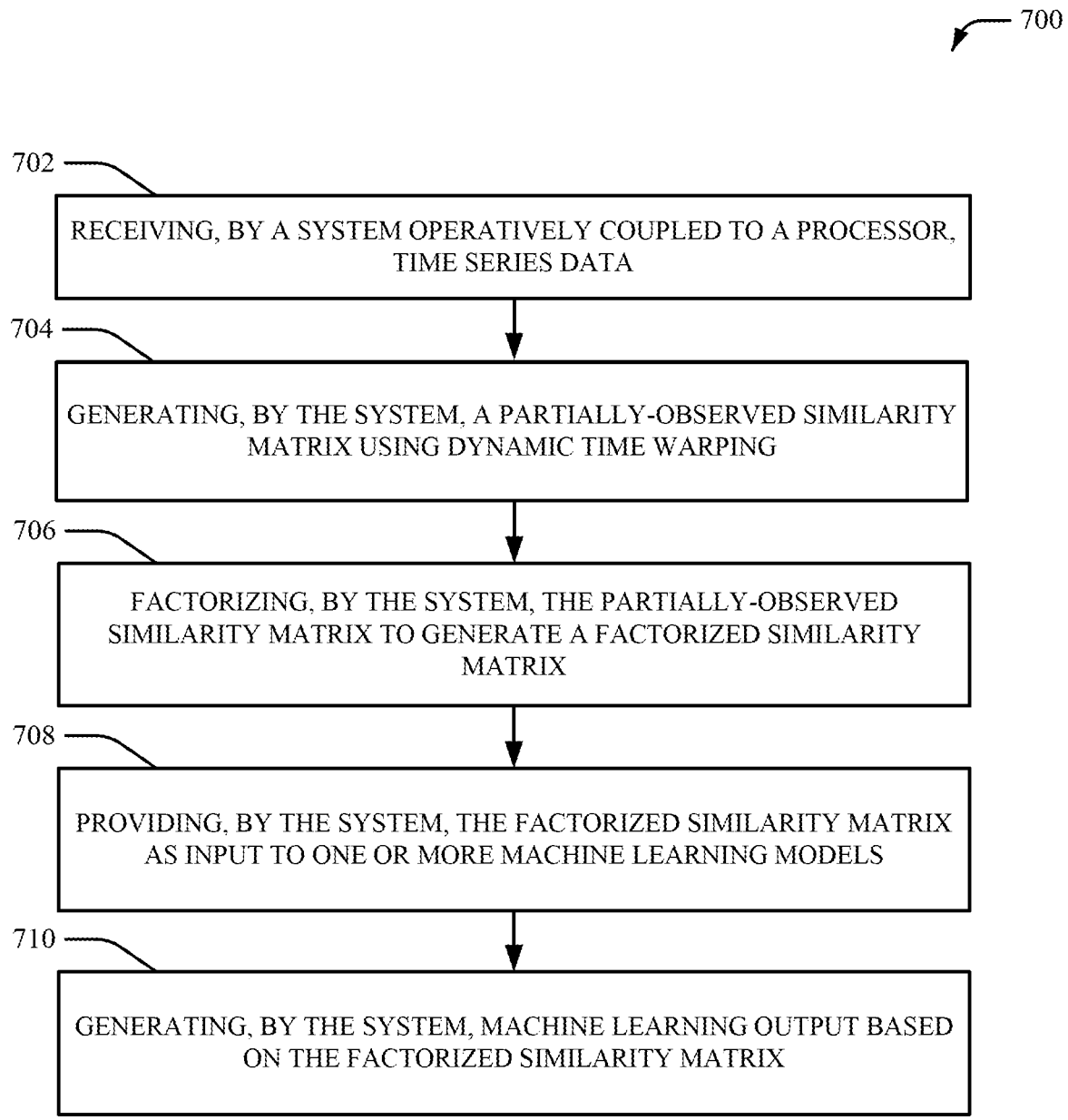
FIG. 7 illustrates a flow diagram of another example, non-limiting computer-implemented method for facilitating machine learning using time series data in accordance with one or more embodiments described herein.

FIG. 7 illustrates a flow diagram of an example, non-limiting computer-implemented method 700 for facilitating machine learning using time series data in accordance with one or more embodiments described herein. At 702, time series data is received by a system operatively coupled to a processor (e.g., by matrix generation component 104). For example, a plurality of streams of time series data with unequal time spans and/or a plurality of streams of time series data with equal time spans can be received. At 704, a partially-observed similarity matrix is generated, by the system (e.g., by matrix generation component 104), using dynamic time warping. For example, similarities between the time series data can be measured by aligning different streams of the time series data and/or by comparing corresponding time series values between the different streams of the time series data. At 706, the partially-observed similarity matrix is factorized, by the system (e.g., by matrix factorization component 106), to generate a factorized similarity matrix. For example, dimensionality of the partially-observed similarity matrix can be reduced by representing the partially-observed similarity matrix as a first factorized similarity matrix and a second factorized similarity matrix that approximate the partially-observed similarity matrix when multiplied together. At 708, the factorized similarity matrix is provided, by the system (e.g., by matrix factorization component 106), as input to one or more machine learning models. For example, the factorized similarity matrix can be provided to a classification machine learning model, a regression machine learning model, a clustering machine learning model and/or another type of machine learning model. At 710, machine learning output is generated, by the system (e.g., by machine learning component 108), based on the factorized similarity matrix. For example, one or more inferences among the time series data associated with the factorized similarity matrix can be determined, one or more predictions among the time series data associated with the factorized similarity matrix can be determined, one or more relationships among the time series data associated with the factorized similarity matrix can be determined, one or more classifications of the time series data associated with the factorized similarity matrix can be determined, etc.

Figure 8:
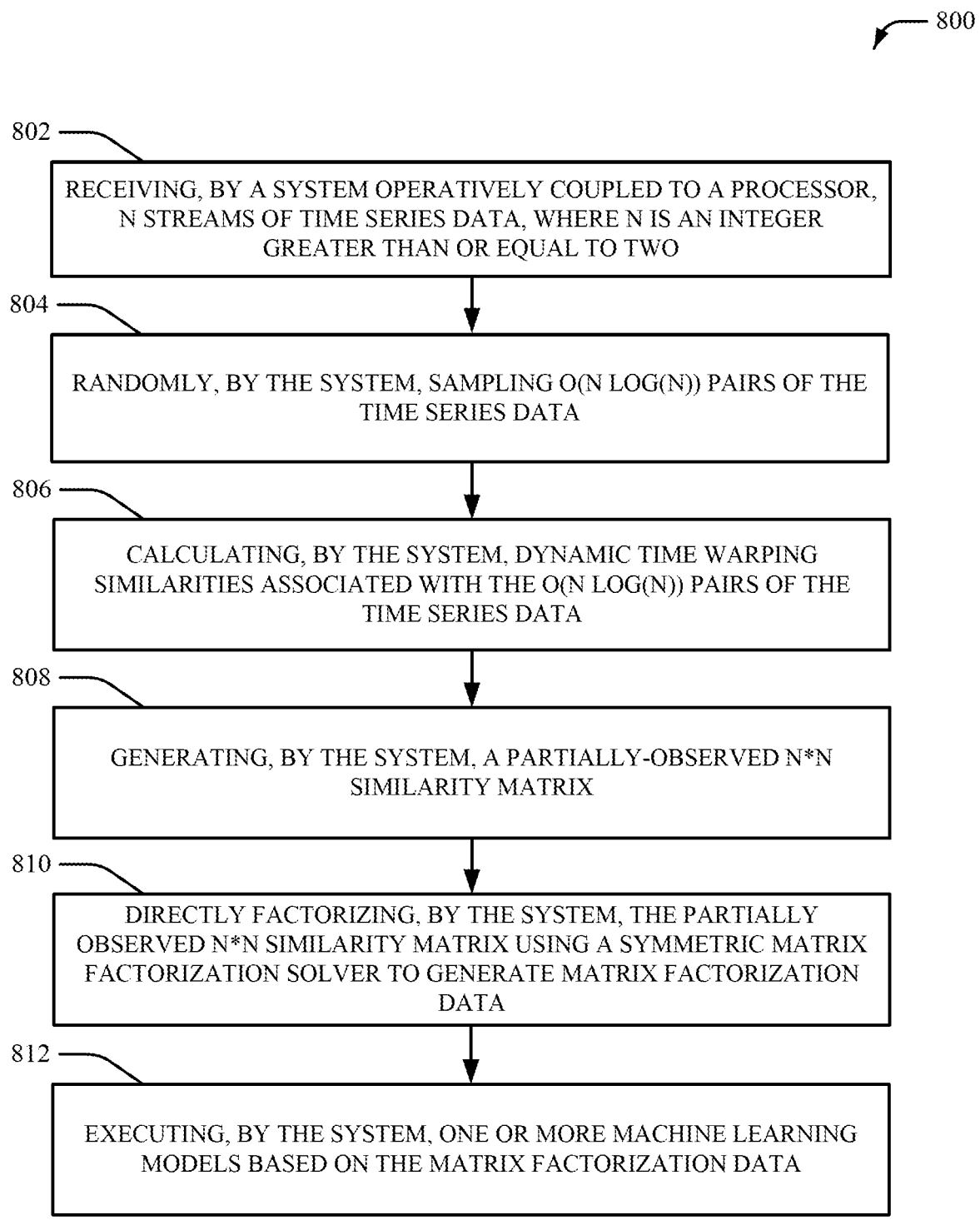
FIG. 8 illustrates a flow diagram of yet another example, non-limiting computer-implemented method for facilitating machine learning using time series data in accordance with one or more embodiments described herein.

FIG. 8 illustrates a flow diagram of an example, non-limiting computer-implemented method 800 for facilitating machine learning using time series data in accordance with one or more embodiments described herein. At 802, N streams of time series data is received, by a system operatively coupled to a processor (e.g., by matrix generation component 104), where N is an integer greater than or equal to two. At 804, O(n log(n)) pairs of the time series data are randomly sampled by the system (e.g., by matrix generation component 104). For example, the time series data can be randomly sampled based on a logarithmic value associated with a total number of the streams of the time series data. At 806, dynamic time warping similarities associated with the O(n log(n)) pairs of the time series data are calculated by the system (e.g., by matrix generation component 104). For example, similarities between the O(n log(n)) pairs of the time series data can be measured by aligning the O(n log(n)) pairs of the time series data. At 808, a partially-observed N*N similarity matrix is generated by the system (e.g., by matrix generation component 104). For example, a partially-observed N*N similarity matrix with a set of data elements associated with void data and another set of data elements associated with measured similarities between the O(n log (n)) pairs of the time series data can be generated. At 810, the partially observed n*N similarity matrix is directly factorized by the system (e.g., by matrix factorization component 106) using a symmetric matrix factorization solver to generate matrix factorization data. For example, the matrix factorization data can include a set of factorization matrices that approximate the partially observed n*N similarity matrix when multiplied together. At 812, one or more machine learning models are executed by the system (e.g., by machine learning component 108) based on the matrix factorization data. For example, the matrix factorization data associated with the N streams of time series data can be provided as input to the one or more machine learning models.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating a data matrix, performing matrix factorization, executing a machine learning model, and/or generating machine learning output are established from a combination of electrical and mechanical components and circuitry, a human is unable to replicate or perform processing performed by the time series data component 102 (e.g., the matrix generation component 104, the matrix factorization component 106 and/or the machine learning component 108) disclosed herein. For example, a human is unable to communicate time series data and/or process time series data associated with a matrix generation process, a matrix factorization process and/or a machine learning model. Furthermore, a human is unable to execute a machine learning model based on matrix factorization data associated with time series data.

Figure 9:
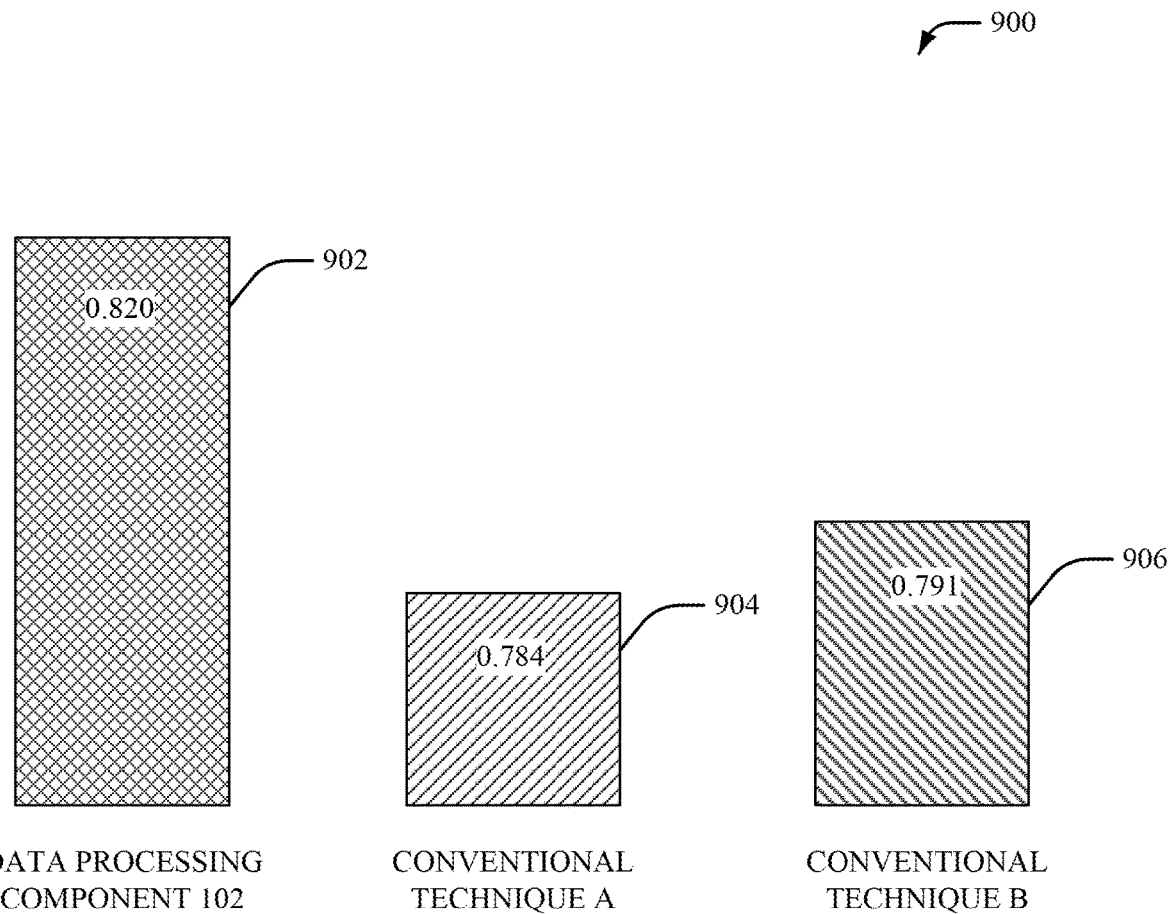
FIG. 9 illustrates a graph of area under curve scores for an example, non-limiting machine learning process in accordance with one or more embodiments described herein.

FIG. 9 illustrates a graph 900 of area under curve (AUC) scores for an example, non-limiting machine learning process in accordance with one or more embodiments described herein. As shown in FIG. 9, an AUC score 902 for a machine learning process executed by the time series data component 102 can be equal to 0.820, an AUC score 904 for a machine learning process executed by a conventional technique A can be equal to 0.784, and an AUC score 906 for a machine learning process executed by a conventional technique B can be equal to 0.791. The AUC score 902, the AUC score 904 and the AUC score 906 can be an evaluation metric for classifying data where a higher score corresponds to a higher degree of accuracy. Therefore, as shown in FIG. 9, a machine learning process executed by the time series data component 102 can correspond to a higher degree of accuracy and/or higher quality than conventional techniques.

Figure 10:
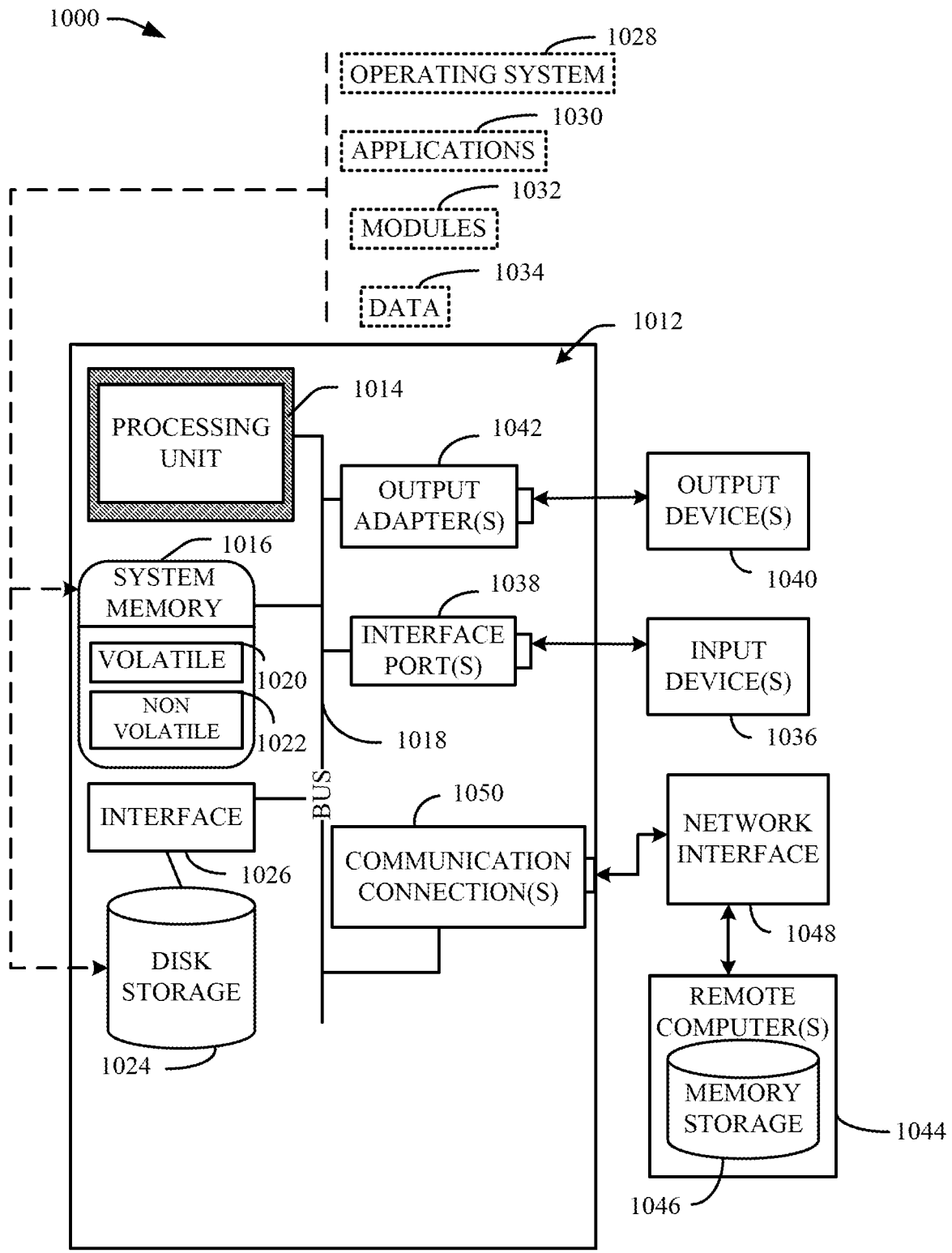
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
a memory; and
a processor, operably coupled to the memory, and wherein the processor:
receives a first stream of time series data comprising first data elements describing a first event over time and a second stream of time series data comprising second data elements describing a second event over time, wherein the first stream is based on partial observation of the first event over time with the first stream comprising a void data element where no observation of the first event was made, generates an n by n partially-observed similarity matrix by randomly sampling O(n log(n)) pairs of time series data between the first stream of time series data and the second stream of time series data based on a dynamic time warping process that pairs elements from different times based on similarity, wherein n is the total number of time series pairs between the first stream of time series data and the second stream of time series data, based on a symmetric matrix factorization process, factors the partially-observed similarity matrix into a first factorization data matrix and a second factorization data matrix, trains a machine learning model based on first matrix data associated with the first factorization data matrix and second matrix data associated with the second factorization data matrix wherein the first matrix data comprises void data based on the void data element, and based on the machine learning model, generates a prediction for a future occurrence of the first event by employing a machine learning process.

2. The system of claim 1, wherein the first stream of time series data comprises a first time span and the second stream of time series data comprises a second time span, wherein the second time span is different than the first time span, and wherein the dynamic time warping process pairs the elements based on aligning elements of the first time span and the second time span.

3. The system of claim 2, wherein the aligning of the elements of the first time span and the second time span comprises modifying time data associated with the elements of the first time span and the second time span.

4. The system of claim 1, wherein the machine learning model comprises a neural network.

5. The system of claim 1, wherein the processor trains the machine learning model based on the void data of the first matrix data by cyclically analyzing the void data based on a cyclic coordinate descent process.

6. The system of claim 1, wherein the processor maintains temporal data of the first stream of time series data and the second stream of time series data.

7. The system of claim 1, wherein the processor trains the machine learning model based on the first matrix data and the second matrix data to facilitate a reduced amount of time to generate machine learning output via the machine learning model.

8. The system of claim 1, wherein the processor further generates, based on the machine learning model, machine learning output to facilitate classification or grouping of data associated with at least one of an image processing system, a video processing system, a signal processing system, and a data analytics system.

9. A computer program product for machine learning, the computer program product comprising a computer readable storage medium having program instructions embodied therewith, the program instructions executable by a processor to cause the processor to:

receive a first stream of time series data comprising first data elements describing a first event over time and a second stream of time series data comprising second data elements describing a second event over time, wherein the first stream is based on partial observation of the first event over time with the first stream comprising a void data element where no observation of the first event was made, generates an n by n partially-observed similarity matrix by randomly sampling O(n log(n)) pairs of time series data between the first stream of time series data and the second stream of time series data based on a dynamic time warping process that pairs elements from different times based on similarity, wherein n is the total number of time series pairs between the first stream of time series data and the second stream of time series data, based on a symmetric matrix factorization process, factor the partially-observed similarity matrix into a first factorization data matrix and a second factorization data matrix, train a machine learning model based on first matrix data associated with the first factorization data matrix and second matrix data associated with the second factorization data matrix wherein the first matrix data comprises void data based on the void data element, and based on the machine learning model, generate a prediction for a future occurrence of the first event by employing a machine learning process.

10. The computer program product of claim 9, wherein the dynamic time warping process pairs the elements based on aligning elements of the first time span and the second time span.

11. The computer program product of claim 10, wherein the dynamic time warping process is performed repeatedly for a defined amount of time.

12. The computer program product of claim 9, wherein the first stream of time series data comprises a first time span and the second stream of time series data comprises a second time span, wherein the second time span is different than the first time span.

13. The computer program product of claim 9, wherein the program instructions are further executable by the processor to cause the processor to:
maintain temporal data of the first stream of time series data and the second stream of time series data.

14. The computer program product of claim 9, wherein the program instructions are further executable by the processor to cause the processor to:
train the machine learning model based on the first factorization matrix data and the second factorization matrix data to facilitate a reduced amount of time to generate machine learning output via the machine learning model.

15. The computer program product of claim 9, wherein the program instructions are further executable by the processor to cause the processor to:
generate, based on the machine learning model, output to facilitate classification or grouping of data associated with at least one of an image processing system, a video processing system, a signal processing system, and a data analytics system.

* * * * *